March 19, 1957  E. J. DUFAULT ET AL  2,785,719
METHOD OF DERINDING HOG FATS
Filed Nov. 17, 1953  2 Sheets-Sheet 1
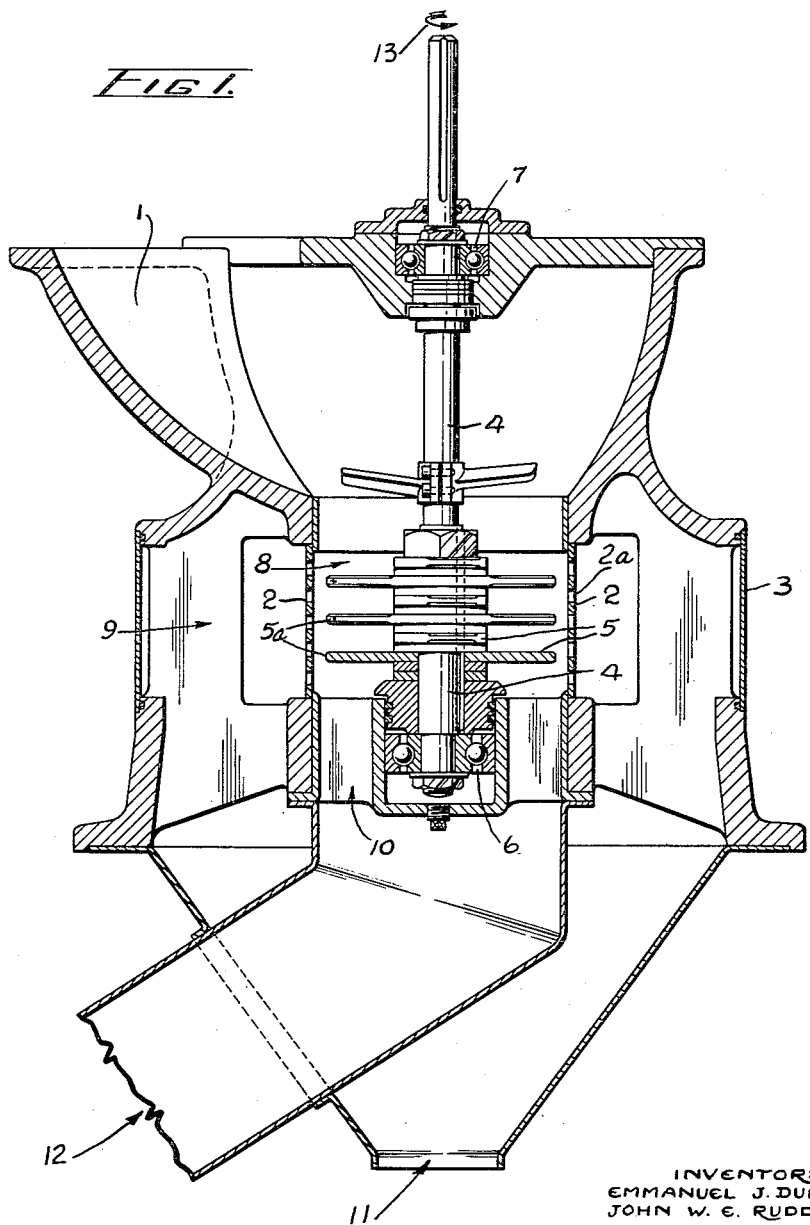
INVENTORS
EMMANUEL J. DUFAULT
JOHN W. E. RUDDELL
EDWIN W. D. CAMPBELL
BY
Maybee & Legris
ATTORNEYS.

March 19, 1957 E. J. DUFAULT ET AL 2,785,719
METHOD OF DERINDING HOG FATS
Filed Nov. 17, 1953 2 Sheets-Sheet 2
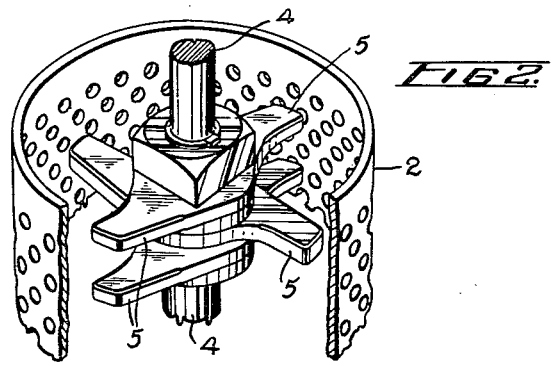
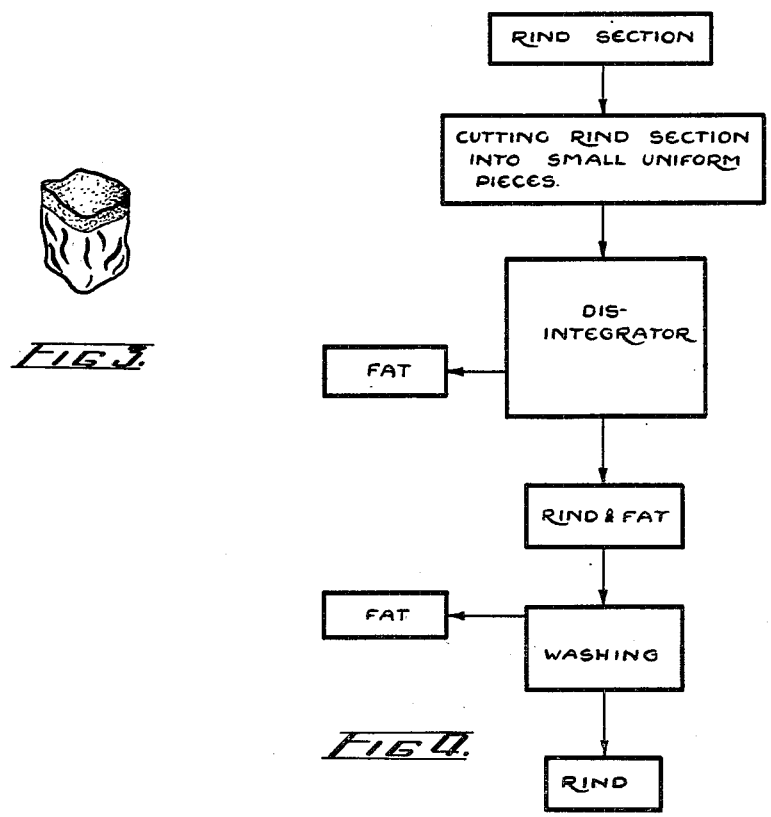
INVENTORS
EMMANUEL J. DUFAULT
JOHN W. E. RUDDELL
EDWIN W. D. CAMPBELL
BY
*Maybee & Legris*
ATTORNEYS.

United States Patent Office 2,785,719
Patented Mar. 19, 1957

2,785,719

METHOD OF DERINDING HOG FATS

Emmanuel Joseph Dufault, North York Township, Ontario, John Wallace Edgar Ruddell, Etobicoke Township, Ontario, and Edwin William Dundas Campbell, Toronto, Ontario, Canada, assignors to Canada Packers, Limited, Toronto, Ontario, Canada, a corporation Application November 17, 1953, Serial No. 392,712

6 Claims. (Cl. 146—226)

This invention relates to the separating of fat from the rind of an animal of the type in which a layer of fat is attached to the skin, more particularly the hog. In the processing of pork, the rind is cut off the carcass in sections along with a layer of fat which is attached to the rind. The fat is useful in making lard. The rind from which the fat has been removed is used as a source of gelatine. The fat can be removed from the rind by the application of heat, commonly called rendering, but this process also removes the gelatine from the rind. Therefore when it is desired to use the rind for the extraction of gelatine the fat is usually cut off by hand or by a mechanical skinner. Present methods of mechanical and hand derinding, produce rinds which contain from 10% to 45% by weight of fat. This is wasteful because the presence of fat on the rind makes the process of removing gelatine from the rind more difficult, and the fat which is removed in the gelatine making process makes poor quality lard. In fact in some countries it is prohibited to use such fat for making lard.

There are several machines on the market which are used for mechanical derinding. These machines are known as "skinners." One of these will be briefly described by way of example. This machines requires two attendants. The rind section with the fat attached is gripped by simple securing means and then a knife or trimmer cuts the fat off the skin or rind, after which the gripped end of the rind is trimmed by hand by one operator while the other operator is placing a new section in the machine. Such a machine is usually used for back sections and cannot operate economically on pieces of rind less than one half square foot in area and many rind sections are smaller or of such odd shape that they must be processed entirely by hand or more likely not defatted at all.

A typical analysis of a rind section from which the fat has been removed by a mechanical skinner, prior to hand trimming, would be: Fat 25% by weight—moisture 45% by weight.

As mentioned above, smaller pieces known as trimmings, or pieces with odd shapes, are usually not defatted at all or must be defatted by hand, using a special knife or scraper. This is a slow operation and depends for its success on the skill of the operator. Because of its relatively high cost it has a limited use. A typical analysis of rind from which the fat has been removed by hand would be: Fat 34%-42%—moisture 30%-40%.

The purpose of the present invention is to provide a method whereby quickly and with a minimum of labour, fat may be separated from the rind of an animal producing a rind fraction with a very low fat concentration and corresponding high protein and moisture content, regardless of the original size or shape of the rind section.

According to the present invention the rind with attached fat is subjected to repeated impacts under such conditions and for such period of time as is required to disintegrate substantially all the fat, that is to say to destroy its cellular structure, leaving the rind substantially intact, and then adhering but disintegrated fat is removed from the rind.

The invention is hereinafter more particularly described and is illustrated in the annexed drawings in which:

Figure 1 is a diagrammatic vertical cross-section of a disintegrating machine suitable for use in the process hereafter described;

Figure 2 is a perspective view on a larger scale with parts broken away and in section showing the shape of the hammer or beater and the relationship between the hammer and the screen of the disintegrator;

Figure 3 is a diagram of a typical piece of rind section; and

Figure 4 is a schematic view of the various steps of the process.

The skin or rind of a hog is usually removed from the meat in sections, which sections have an area varying from relatively large back or side pieces, for example, twenty-four inches by ten inches, to odd shaped pieces taken from the legs, feet and other irregular parts of the animal. These sections comprise over 91% of the rind, the rest being odd bits known as trimmings. These sections consist of the rind proper which may be about 3/16 inch thick to which is attached a layer of fat which would average about three quarters inch thick. The problem is to separate the fat from the rind economically. In describing this invention, the word "rind" will be used to describe the skin from which the hair has been removed and the expression "rind section" will be used to describe the pieces of rind with attached fat which are removed from the carcass not including trimmings. According to this invention the rind sections are first cut into small pieces varying from one half inch to one and one half inches in width and from one and one half inches to three inches in length. These may be cut by any suitable means, such as the machine disclosed in U. S. Patent 2,465,670 issued March 29, 1949. In actual practice applicants use a coarse cutting machine commonly called a prebreaker manufactured by Rietz Manufacturing Co., 150 Todd Road, Santa Rosa, California, which is illustrated in a printed brochure published in 1950 entitled, "Rietz Prebreaker" or by any other suitable means. Trimmings are usually already small enough to be processed in a disintegrator, but in practice they are usually passed through the prebreaker with the sections. Many trimmings are long and narrow and these are cut into short pieces in the prebreaker. Since there is nothing new and nothing depends on the specific apparatus for cutting up the rind sections, this is not illustrated in the accompanying drawings but is merely diagrammatically indicated in the chart of Figure 4. The cutting of the sections into small pieces as above described serves two purposes; first it facilitates the process of removing the fat; and secondly it reduces the rind to the size or shape required for a subsequent process of removing gelatine therefrom.

The cut pieces are then fed into an impact disintegrator. This disintegrator is conveniently of the type diagrammatically illustrated in Figure 1 of the drawings and shown and described in the following United States patents: 2,082,419 June 1, 1937—Rietz; 2,153,590 April 11, 1939 — Rietz; 2,325,426 July 27, 1943 — Rietz; 2,543,599 February 27, 1951—Rietz; 2,545,159 March 13, 1951—McGihon: and, 2,573,048 October 30, 1951— Newkirk.

The disintegrator illustrated in Figure 1 includes a gravity feed inlet hopper 1 opening into a disintegrating zone 8 surrounded by a screening area formed by a cylindrical screen 2 having perforations 2a therein which may vary from one sixteenth inch to one half inch in diameter for the present purposes. Surrounding the screen 2 is a casing 3 which encloses the primary discharging zone 9 from which, if the process is to be continuous, a discharge outlet 11 is provided.

Extending from the vertical shaft 4 in the disintegrating zone are a plurality of hammers 5 and the shaft 4 is mounted in bearings 6 at the bottom of the machine and bearings 7 at the top of the machine and is rotatably driven by means, not shown, in the direction indicated by the arrow 13 in Fig. 1 of the drawing. Material which does not pass through the perforated screen to the primary discharging zone 9 will pass out through the secondary discharging zone 10 from which a discharge outlet 12 is provided.

Such a machine is used for various grinding purposes. However, for the present purposes the machine is used to beat rather than to cut or grind the pieces of rind. In order that the cutting action may be eliminated or materially reduced, the leading edge of each hammer is curved and the other edges and corners are rounded or chamfered as illustrated in Figure 1 and Figure 2. Furthermore, the tips 5a of the hammers are shortened so as to allow from one-eighth inch to three-eighth inch clearance between the tip of the hammer and the screen, so that pieces of rind section may pass through and will not be ground between the end of the hammer and the screen.

The speed of rotation of the hammers varies and the best speed can be determined by simple experiment. However, it has been found that a tip speed of 7,500 feet per minute is satisfactory for the purpose, since it will with the modified hammer, result in a strong beating action which will disintegrate the fat but leave the rind intact as hereafter described. However, separation can be obtained with speeds as low as 3,000 or as high as 15,000 feet per minute. The separation is based on the physical strength of the material being subjected to the impact of the hammers. It can readily be seen that there is a very considerable difference between the physical strength or toughness of the rind of the hog and the fat which adheres to it. The combination of tip speed and clearance with the modified shape beats the rind until the cellular structure of adhering fat is destroyed without breaking up the rind proper. The thus disintegrated fat will largely pass through the screen of the disintegrator and the pieces of rind from which the fat has been removed will pass through the secondary outlet of the disintegrator.

The total secondary discharge will have a typical analysis of: Fat 19%, moisture 51%, protein 30%.

The fat content of this material is reduced further by simple washing procedures such as would not be effective for rinds from which the fat has been removed by previous methods. The reason for this is that by the present method the repeated impacts of the hammers or beater arms break up the cellular structure which causes the fat to adhere to the rind. Thus, a great deal of the fat which remains on the rind is no longer connected to it by tissue and therefore can be washed off by a simple washing process.

By allowing the material which is discharged from the secondary outlet of the mill or disintegrator to drop into a container of warm water at a temperature of 100 to 212° F., and stirring gently, a considerable amount of fat will float to the top of the water layer. The top layer of water and fat with some tissue can be decanted and the rinds collected from the bottom of the water layer. This can be made a continuous procedure by allowing continuous decanting. Since many apparatuses can be used for washing the rinds, no special apparatus has been shown but suitable decanting or skimming apparatus is illustrated in the literature and in patents, for instance, U. S. Patent 2,357,566 to C. T. Walter et al.

Hog fat will melt between 100° F.–125° F. The washing of the rinds is expedited if the temperature of the water exceeds the melting point of the fat. However, heat will tend to remove the gelatine from the rind. Therefore the higher the temperature of the water, the shorter the washing time should be. The washing time should be only sufficient to remove the adhering fat. Optimum times and temperatures can easily be determined experimentally.

If the washing water is warm, this may result in rapid bacteriological deterioration of the rinds after all the fat has been removed. To prevent this it is preferred to chill the rinds rapidly, preferably by dropping them into cold water at 34° to 65° F. with mild agitation. Any further fat which is washed off at this stage can be decanted and the rinds collected from the bottom of the water layer. If desired, this operation can be made continuous by allowing continuous decanting.

Excess water is then allowed to drain from the rinds, and an approximate analysis of the rinds after the washing process would be: Moisture 70%, fat 4%, protein 26%.

It will be noted that not only is the fat content of the rind less after the initial beating process, but the subsequent simple washing process reduces the fat in the rind to a negligible amount which can readily be handled in the gelatine removing process. The reason that the remaining fat can be washed out so readily is that substantially all the fat cells which have not been actually separated from the rinds by the disintegrating machine or mill have been broken or separated from the rinds per se. In derinding methods as practiced at present, the fat cells are unbroken on the rind and therefore cannot be separated by a simple washing process following the cutting or scraping process.

The invention as above described has the following advantages:

(1) The cost of processing has been very materially reduced.

(2) The amount of rind which can be recovered economically, has been very materially increased.

(3) The recovery of fat for lard has been increased.

(4) Only traces of rind remain mixed with the fat, with the result that the lard is of better colour.

(5) The cooking time in the lard rendering process is reduced.

(6) The fat content of the finished rinds has been reduced, thus exposing the soft inner surface of the rind so that the gelatine can be removed more readily.

(7) The defatted rind is in small comparatively uniform size ready for processing to recover the gelatine.

(8) The process enables the fat to be economically removed from rinds of all shapes and sizes from large back sections to small trimmings.

The following are specific examples of the application of this new process:

*Example 1*

The following mixture of "rind-on" fats was processed using the new method.

| | Lbs. |
|---|---|
| Ham fat | 30 |
| Back fat | 114 |
| Shoulder fat | 90 |
| Other fats | 19 |
| Scalps | 4 |
| Pickle fat | 45 |
| Total | 302 |

The above were all in the form of rind sections, including large sections and trimmings, from which no fat had been removed. This material was fed into the hopper of a Rietz prebreaker which cut the fat into pieces. These pieces were then fed into an 8" Rietz disintegrator. This disintegrator was fitted with modified blades and a screen having 3/16" circular holes. The secondary outlet of this machine was open. The top speed of the blades of the mill was 7,500 feet per minute.

The discharge of rind pieces from the secondary outlet of the mill was dropped into warm water (140° F.) and stirred gently. The warm water was decanted from the rinds which had settled to the bottom. The rinds were then transferred to a container of cold water (50° F.) and stirred gently. Again the water was decanted from over the rinds. The rinds were then placed on a screen and allowed to drain.

62 lbs. of this material was recovered and had the following analysis:

|  | Percent |
|---|---|
| Moisture | 62.6 |
| Fat | 3.3 |

Example 2

895 lbs. of "rind-on" ham fat was processed using the new method. The conditions were similar to Example 1.

157 lbs. of rind material was recovered having the following analysis:

|  | Percent |
|---|---|
| Moisture | 70.6 |
| Fat | 8.0 |

Example 3

1002 lbs. of "rind-on" shoulder fat was processed using the new method. The conditions were similar to Example 1.

149 lbs. of rind material was recovered having the following analysis:

|  | Percent |
|---|---|
| Moisture | 68.8 |
| Fat | 8.5 |

Example 4

998 lbs. of "rind-on" back fat trimmings were processed by the new method. The conditions were similar to Example 1.

177 lbs. of rind material was recovered having the following analysis:

|  | Percent |
|---|---|
| Moisture | 67.6 |
| Fat | 4.0 |

Example 5

A mixture of the following "rind-on" fats were processed by the new method.

450 lbs. of ham fat
50 lbs. of rinds from which some of the fat had been removed by the Townsend skinner
50 lbs. of belly trimmings Conditions for this test were similar to Example 1, above, except that the rind material recovered from the secondary outlet of the disintegrator was not washed with warm or cold water.

80 lbs. of rind material was recovered having the following analysis:

|  | Percent |
|---|---|
| Moisture | 51.8 |
| Fat | 24.75 |

This material was not washed, but subsequent washing would have reduced the fat content as in previous examples.

What we claim as our invention is:

1. The method of separating the fat from the rind of an animal of the type in which a layer of fat is attached to the skin, which comprises forming the said rind with fat attached into small pieces, subjecting said small pieces to repeated impacts to disintegrate substantially all the fat leaving the rind substantially intact, and separating the disintegrated fat from the pieces of rind.

2. The method of separating the fat from the rind of an animal of the type in which a layer of fat is attached to the skin, which comprises cutting rind sections with fat attached into smaller comparatively uniform pieces, subjecting the pieces to a beating operation to disintegrate substantially all the fat leaving the rind substantially intact, and separating the disintegrated fat from the pieces of rind.

3. The method of separating the fat from the rind of an animal of the type in which a layer of fat is attached to the skin, which comprises cutting the rind into small pieces, subjecting rind with attached fat to repeated impacts to disintegrate substantially all the fat from the pieces leaving the rind substantially intact, separating substantially all but the adhering disintegrated fat from the small pieces of rind, and subsequently removing the adhering fat from the rind.

4. The method of separating the fat from the rind of an animal of the type in which a layer of fat is attached to the skin, which comprises cutting the rind into small pieces, subjecting the small pieces of rind with attached fat to repeated impacts to disintegrate substantially all the fat from the small pieces of rind leaving the rind substantially intact, and simultaneously and continuously separating the disintegrated fat from the rind.

5. The method of separating the fat from the rind of an animal of the type in which a layer of fat is attached to the skin which comprises subjecting comparatively uniform pieces of rind section with fat attached to repeated impacts to disintegrate substantially all the fat and simultaneously rotating the pieces to separate some of the disintegrated fat from the rind pieces by centrifugal force, and subsequently washing the rind to remove adhering but disintegrated fat.

6. The method of separating the fat from the rind of an animal of the type in which a layer of fat is attached to the skin, which comprises cutting a rind section into small pieces with the fat attached, subjecting said pieces to impact disintegration in a disintegrating zone, the disintegrating zone being surrounded by a screening area, passing separated disintegrated fat through the screening area to a primary discharging zone and passing substantially intact rind pieces with adhering disintegrated fat through one end of the disintegrating zone to a secondary discharging zone, and then removing the adhering fat from the rind pieces.

References Cited in the file of this patent
UNITED STATES PATENTS

| 2,281,609 | Walter | May 5, 1942 |
| 2,357,566 | Walter et al. | Sept. 5, 1944 |
| 2,545,159 | McGihon | Mar. 13, 1951 |